US008651878B2

(12) United States Patent
Björklund

(10) Patent No.: US 8,651,878 B2
(45) Date of Patent: Feb. 18, 2014

(54) I/O MODULE

(75) Inventor: Hans Björklund, Ludvika (SE)

(73) Assignee: ABB Technology AG, Zurich (CH)

( * ) Notice: Subject to any disclaimer, the term of this patent is extended or adjusted under 35 U.S.C. 154(b) by 62 days.

(21) Appl. No.: 13/514,501

(22) PCT Filed: Dec. 8, 2009

(86) PCT No.: PCT/EP2009/066633
§ 371 (c)(1),
(2), (4) Date: Jun. 27, 2012

(87) PCT Pub. No.: WO2011/069537
PCT Pub. Date: Jun. 16, 2011

(65) Prior Publication Data
US 2012/0264312 A1 Oct. 18, 2012

(51) Int. Cl.
H01R 9/00 (2006.01)
(52) U.S. Cl.
USPC .......................................................... 439/76.1
(58) Field of Classification Search
USPC ........................................ 439/76.1, 76.2, 716
See application file for complete search history.

(56) References Cited

U.S. PATENT DOCUMENTS

| 4,152,750 A |   | 5/1979  | Bremenour et al. |         |
|-------------|---|---------|------------------|---------|
| 5,615,079 A | * | 3/1997  | Eggert et al.    | 361/637 |
| 5,722,862 A | * | 3/1998  | Glathe et al.    | 439/709 |
| 5,741,142 A | * | 4/1998  | Dux et al.       | 439/76.1|
| 6,241,561 B1| * | 6/2001  | Zebermann et al. | 439/716 |
| 6,575,771 B2|   | 6/2003  | Schnatwinkel et al. |     |
| 7,553,199 B2|   | 6/2009  | Correll          |         |
| 8,189,350 B2| * | 5/2012  | Gaub et al.      | 361/823 |
| 2003/0193784 A1| * | 10/2003 | Bet et al.    | 361/729 |
| 2007/0233323 A1|   | 10/2007 | Wiemeyer et al. |         |
| 2009/0221166 A1|   | 9/2009  | Berdah et al.   |         |

FOREIGN PATENT DOCUMENTS

| DE | 196 00 997 A1 | 7/1997  |
| DE | 203 19 657 U1 | 6/2005  |
| EP | 1 983 812 A1  | 10/2008 |

OTHER PUBLICATIONS

"ioLogik E2260 User's Manual", XP002620847, Moxa, Fourth Edition, Jun. 2009.

* cited by examiner

Primary Examiner — Gary Paumen
(74) Attorney, Agent, or Firm — Birch, Stewart, Kolasch & Birch LLP

(57) ABSTRACT

The present invention relates to an apparatus for connection between power transmission system field equipment and control and protection equipment and comprising at least one input/output module (24). The module (24) comprises a box (34) enclosing a circuit board with at least one signal handling unit, at least one bus connector (36, 38) that stretches through a first side of the box, and a set of terminal blocks (40) for connection of field wires to the field equipment, where the terminal blocks are placed on a second side of the box. The at least one signal handling unit includes at least one unit for conversion of input and output signals to and from the field equipment and bus communication according to a bus communication protocol.

20 Claims, 3 Drawing Sheets

I/O MODULE

FIELD OF THE INVENTION

The present invention generally relates to power transmission systems. More particularly the present invention relates to an apparatus for connection between power transmission system field equipment and control and protection equipment.

BACKGROUND

In power transmission systems, such as in direct current (DC) power transmission systems, an input/output device or I/O unit is a device or unit which receives and transmits signals between field equipment, like circuit breakers and transformers, and control and protection computers. The signals can be analog signals, such as system measurement signals in which A/D conversion is performed. The signals can also be digital signals like control signals and status signals. For this reason the I/O units communicate with such control and protection computers via a field bus and with the field equipment via field wiring.

There exist some implementations where distributed I/O (input/output) units are used in HVDC (High Voltage Direct Current, FACTS (Flexible Alternating Current Transmission System) and AC substation applications.

Many such systems and applications are designed such that the connection points for field wiring are on the I/O units using circuit board mounted terminal blocks.

Such terminal blocks are not suitable to connect directly to the cables from the field. For example, they are difficult to adapt to the varying specific utility requirements and strict internal rules regulating the type of terminal block that are allowed in their stations.

There exist a number of documents describing connections of terminal blocks.

U.S. Pat. No. 7,553,199 describes a terminal block connected to a circuit board as well as to a DIN rail.

DE 203 19 657 describes an I/O unit with a box having a rail and openings for receiving field wires. The box is a terminal block arrangement with at least one input terminal block, a freely selectable number of connecting blocks and a bus terminating block, each with an insulating housing, several connectors and a free space for a circuit board with an electronic circuit.

DE 196 00 997 likewise describes terminal blocks on a DIN rail. A number of terminal blocks make up a bus subscriber, which includes a processing unit and senders and receivers for interconnecting several bus subscribers.

U.S. Pat. No. 6,575,771 describes a terminal block on a DIN rail, which can be connected to power supply and monitoring and control signal voltages via a bus connector unit and which can receive a circuit board. The terminal block also has terminal strips for connection to corresponding terminal strips on the circuit board.

U.S. Pat. No. 2009/0221166 describes an I/O wiring interface with a terminal block connector inside a housing. Inside this housing there is also an I/O module implemented through a circuit board.

U.S. Pat. No. 2007/0233323 also describes a modular I/O device that includes digital and analog input and output modules connectable to a each other and to a DIN rail.

However given the above mentioned problems, there is still a need for simplifying connection of terminal blocks with units providing the required I/O functionality.

SUMMARY OF THE INVENTION

The present invention addresses this situation. The invention is thus directed towards solving the problem of simplifying the connection of terminal blocks to units providing I/O functionality.

This problem is according to one aspect of the invention solved through an apparatus for connection between power transmission system field equipment and control and protection equipment and comprising at least one input/output module, the input/output module comprising a box enclosing at least one circuit board with at least one signal handling unit, at least one bus connector that stretches through a first side of the box, and a set of terminal blocks for connection of field wires to the field equipment, the terminal blocks being placed on a second side of the box, wherein the at least one signal handling unit includes at least one unit for conversion of input and output signals to and from the field equipment and bus communication according to a bus communication protocol.

The invention has a number of advantages. It allows the use of utility approved terminal blocks on factory produced distributed I/O modules. It provides a compact I/O module that needs limited mounting space. It eliminates the need for separate I/O unit and terminal block cubicles. It can eliminate cables by placing the modules in junction boxes, kiosks in a switchyard or in pieces of field equipment.

BRIEF DESCRIPTION OF THE DRAWINGS

The present invention will in the following be described with reference being made to the accompanying drawings, where FIG. 1 schematically shows an element of a power transmission system with a piece of field equipment, an apparatus according to the invention and process and control computers, FIG. 2 schematically shows an apparatus according to the invention with a gateway module and a number of input/output modules connected to each other.

DETAILED DESCRIPTION OF THE INVENTION

In the following, embodiments of the invention providing the above described functionality will be described.

The present invention is directed towards providing an apparatus in a power transmission system, i.e. in a system for the transmission of electrical power. This system can for instance be a High Voltage High Voltage Direct Current system (HVDC) or a Flexible Alternating Current Transmission System (FACTS). The apparatus provides I/O functionality on one or more circuit boards included in one or more input/output (I/O) modules.

As mentioned above there are problems with terminal blocks being connected to these circuit boards.

It is possible to remove some of these problems through providing distributed I/O modules that are wired through separate terminal blocks, i.e. terminal blocks that are physically separated from the I/O modules. However, this results in a number of disadvantages such as:
- More cubicle space is needed
- Additional wiring and connection points
- More testing
- More complicated documentation needs to be produced It is thus possible to improve on this situation. The present invention is directed towards such an improvement.

Figure 1:
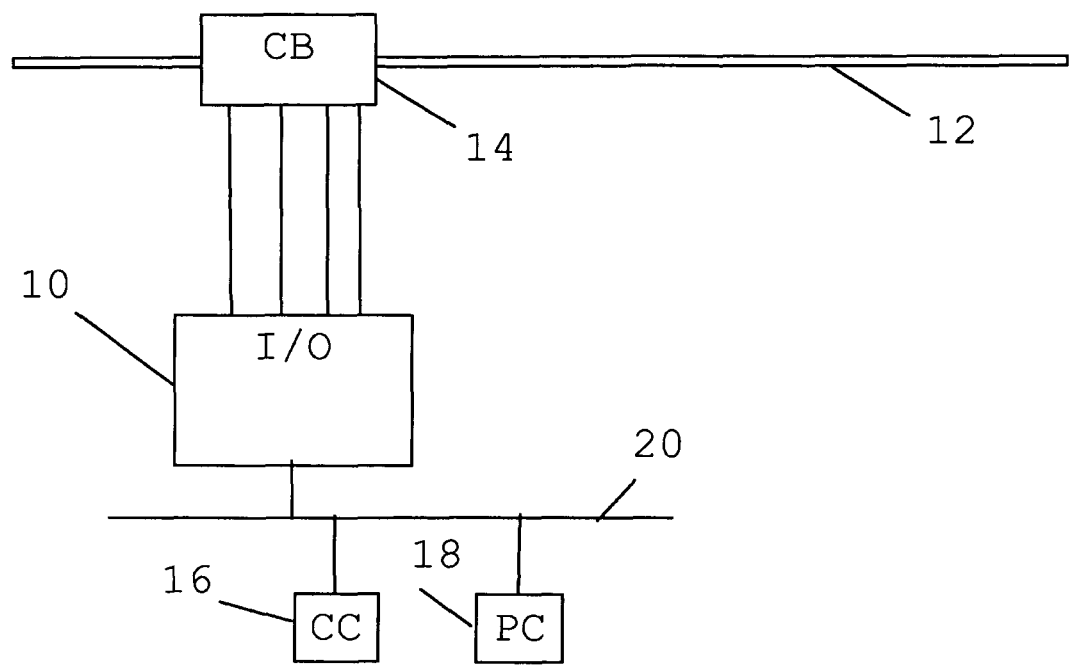

FIG. 1 schematically shows an element 12 of a power transmission system, i.e. an element involved in the process of transmitting electric power. This element 12 is here a power line. To this process element 12 there is connected a field device or a piece of field equipment 14, which piece is here a circuit breaker. A circuit breaker is just one piece of field equipment with which the present invention can be used. Examples on other field equipment are disconnector and ground switches. This piece of field equipment 14 may be provided with process measurement units such as current, voltage and power measurement units, like for instance voltage and current transformers. It may also be equipped with status measurement units, i.e. units measuring the status or health of the piece of field equipment. This piece of field equipment may also receive control commands such as opening and closing commands.

In order to supply and receive these various types of signals, the piece of field equipment 14 is connected to an apparatus 10 according to the invention. The apparatus is with advantage provided in a substation of the system. The apparatus 10 furthermore provides an input/output unit for handling the above-mentioned signals before being forwarded to and from control computers CC 16 and protection computers PC 18. For this reason the apparatus 10 is connected to the piece of field equipment via field wires and to control and protection equipment via a process control bus 20. These pieces of equipment are here provided in the form of control and protection computers 16 and 18.

Here it should be realized that FIG. 1 is greatly simplified and that there may be many more power transmission system elements, pieces of field equipment, pieces of control and protection equipment as well as apparatuses according to the invention. The number has here been limited in order to provide a better focus on the description to the present invention.

Figure 2:
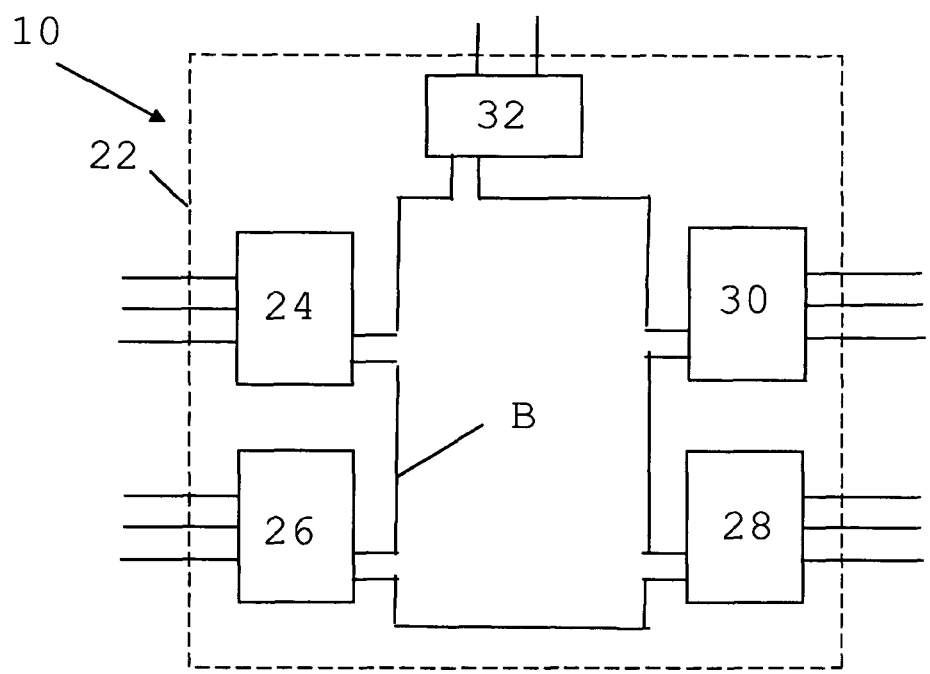

FIG. 2 schematically outlines one variation of the apparatus 10. The apparatus in this variation includes a cubicle or cabin 22, shown as a dashed square, including a number of input/output (I/O) modules 24, 26, 28 and 30, each being arranged to handle the signals on a number of field wires. These I/O modules 24, 26, 28 and 30 are here interconnected via a local data bus B. To this local data bus B there is furthermore connected a gateway module 32 arranged for letting the I/O modules communicate with the process and control computers via the process control bus.

For this reason each I/O module 24, 26, 28, 30 is connected to a number of field wires, here as an example shown as three, and has at least one port or bus connector and here one input and one output port or one input and one output bus connector for connection to the local data bus. The bus connection is here a daisy-chain connection. It should however be realized that the connection could be a star connection or any other suitable bus connection. The communication on this bus may be a field bus type of communication and use a field bus protocol, for instance an Ethernet based field bus protocol such as EtherCAT, SERCOS III or the utility specific process bus protocol according to IEC61850-9. The local data bus B may be an electrical bus. However, it should be realized that it may also be optical. Normally though it is a high-speed bus because some signals need to be used for real time closed-loop control. The I/O modules 24, 26, 28, 30 may with advantage be regularly spaced along the edges of the cubicle 22. This spacing may be regularly along at least one inner side of the cubicle 22.

The apparatus 10 is here shown as including several I/O modules. It should however be realized that it may include more I/O modules. It could of course also include fewer I/O modules and then perhaps only one. In this case there is no need for a gateway module. The module can then be directly provided with process control bus communication ability, i.e. ability to communicate directly with the protection and control computers. The process control bus communication ability is with advantage provided through the use of the IEC 61850 bus communication protocol. It is also possible that the I/O modules are provided with process control bus communication ability also when there is ore than one I/O module. It is in this case also possible to omit the gateway module.

Figure 3:
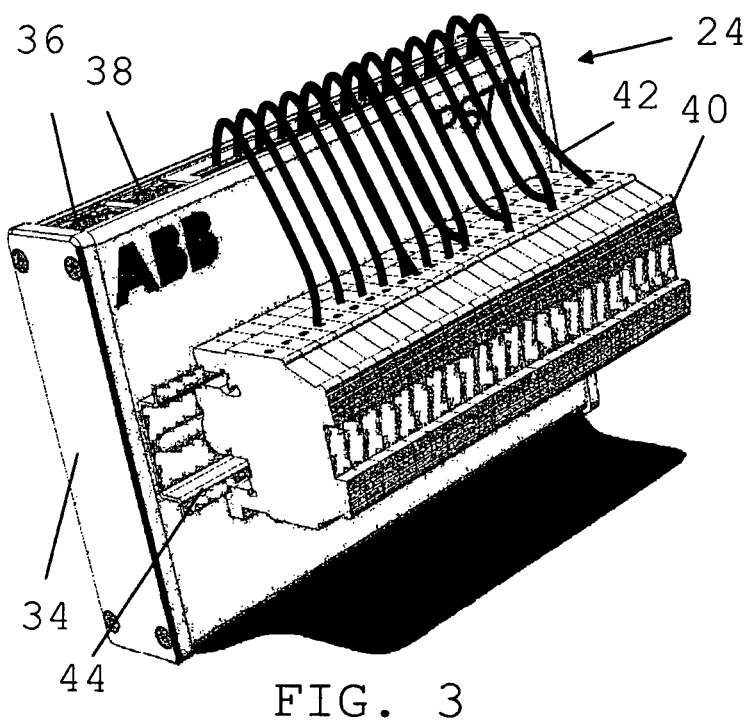
FIG. 3 shows a perspective view of an input/output module according to a first variation of the invention, FIG. 4 schematically shows a perspective view of an input/output module according to a second variation of the invention, and FIG. 5 schematically shows the interior of an input/output module according to the invention.

One variation of such a module is schematically shown in a perspective view in FIG. 3.

The module 24 is provided in the form of a box 34, preferably a shielded box that encloses a circuit board with at least one and preferably more than one signal handling unit. This box 34 does in this embodiment have six sides, where a first side or back side is provided with the previously mentioned bus input and output ports 36 and 38 to the local data bus. These ports are provided as bus connectors that stretch through the first side of the box to the circuit board. On a second side of the box, which second side is with advantage a side adjacent the first side, for instance at right angles to this first side, there is provided fastening means 44, here in the form of a DIN rail. Also a third side of the box, a bottom side parallel with the second side, may be provided with movable fastening means like mounting clamps for flexible fastening to a DIN rail. On the rail 44 placed on the second side of the box 34 a set of terminal blocks 40 is fastened. This set of terminal blocks 40 may also be equipped with movable fastening means like mounting clamps for flexible fastening to the DIN rail 44. The set of terminal blocks 40 is provided for receiving ends of the field wires coming from the field equipment. The set of terminal blocks 40 also has a number of parallel connections to the circuit board inside the box 34.

These connections are with advantage provided in the form of interconnecting wires 42, with one wire leading from one terminal block into the box via said first side. The set of terminal blocks in this embodiment has means in a plane parallel to the second side of the box 34 that receive the field wires. The interconnecting wires 42 leaving the set of terminal blocks for the circuit board may be provided on a side that is parallel with the first side of the box.

The set of terminal blocks 40 is modular and can thus be made of a number of different separable interconnected terminal blocks, being attached to each other for forming the set. Each such block may then be adapted for receiving one field wire of a field cable and is also connected via one further interconnecting wire 42 to the circuit board inside the box 32. It is thus possible that a terminal block is adapted to receive only one field wire. Each terminal block can in this way be formed for meeting a terminal block rule set on the utility where the apparatus is to be provided. The set of terminal blocks 40 is furthermore slidable along the DIN rail 44.

Figure 4:
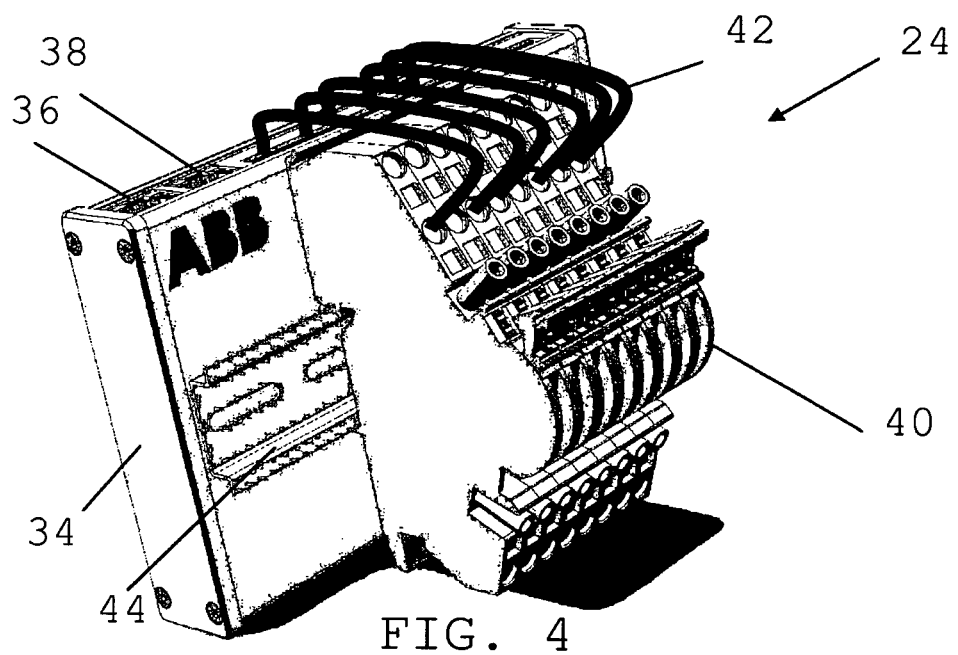

FIG. 4 schematically shows another variation of a set of terminal blocks that is fastened the same way on a shielded box 34 as the variation in FIG. 1. Here the set of terminal blocks 40 is a set of short circuiting test terminal blocks for safe current injection testing.

Figure 5:
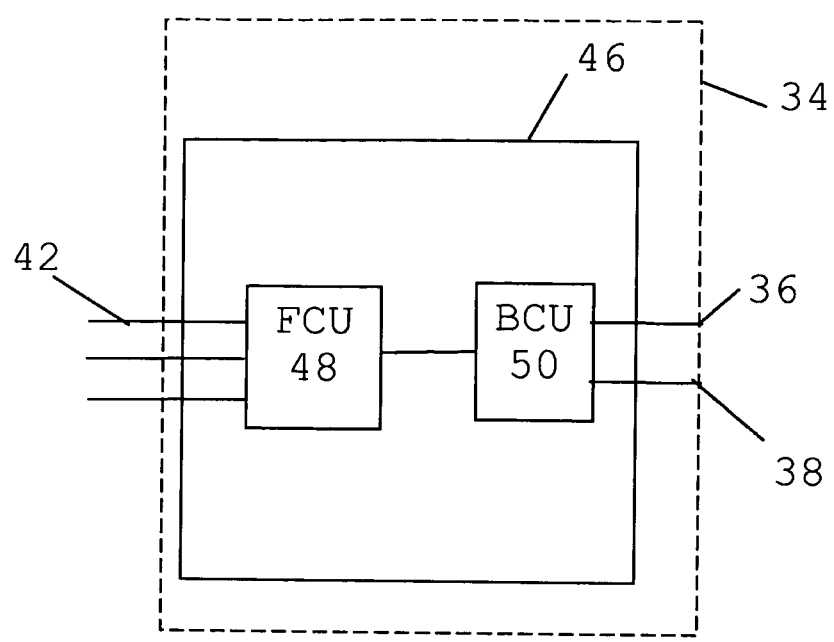

FIG. 5 does finally schematically show the interior of the box 34, which box 34 is indicated through a dashed square. In the interior of the box 34 there is a circuit board 46 on which a field connection unit FCU 48 and a bus communication unit BCU 50 is provided. The field connection unit 48 is connected to the interconnecting wires 42 leading to the set of terminal blocks, while the bus communication unit 50 is connected to the bus connectors 36 and 38 for communicating with the protection and control computers. It should here be realized that it is possible to provide the field connection unit 48 on one circuit board and the bus communication unit 50 on another circuit board.

If the module is to handle analog input signals, i.e. analog signals measured by the field equipment, such measurements are sent on one of the field wires, received by the field connection unit 48 and processed, like A/D-converted and possibly also scaled to an output voltage level. These processed signals are then sent to the bus communication unit 50, which transmits the signals to control and protection computers using a suitable bus communication scheme. In case the signals are digital input signals, these may also be handled or converted, for instance scaled and shaped in order to meet timing and signal level requirements and then forwarded to the bus communication unit 50. In the same way digital output signals may be received by the bus communication unit 50 and forwarded to the field connection unit 48, where such signals may be converted, for instance amplified for enabling use in the piece of field equipment, for instance as a command that makes a circuit breaker break an electrical connection.

According to the invention the circuit boards of an I/O module is placed in a box that may be a "thin" metal or metalized plastic box. On the second side of the box, terminal blocks according to substation requirements, can be placed. The wiring from the terminal blocks to the electronic circuit board may be placed in the factory and fully tested before the I/O module is delivered.

An I/O module may be placed on a DIN rail together with the set of terminal blocks and thus these two combined entities consume limited space.

The set of terminal blocks may be arranged so that it exactly matches the cable used, meaning that each wire in the cable is terminated in one terminal block. This simplifies installation and testing.

Different modules may be developed for current inputs, voltage inputs and binary in- and outputs to connect to breakers, disconnectors or ground switches. For HVDC there could also be modules for resistive voltage dividers and pulse transformers used for line fault locators.

If the I/O modules are designed for extended temperature and humid conditions they can be placed in field junction boxes or directly in the circuit breaker, disconnector or ground switch.

By making the circuit board design in two parts, one for the field connection and one for the field bus interface, it is possible to simplify the factory system test (FST) activity for HVDC deliveries. In an FST the control and protection equipment for a delivery is set up in the factory and connected to a simulator (often a real time digital simulator, (RTDS)). As it is difficult to generate high voltages (100+V) and currents (1-40 A) from an RTDS special boards for FST with low level inputs are often used in place of the I/O boards to be delivered. Therefore only the field bus interface board is needed in an FST. This reduces the setup time, the floor space requirements and testing time substantially.

The invention has a number of advantages.
It allows the use of utility approved terminal blocks on factory produced distributed I/O units It does not need any or only limited additional mounting space It eliminates separate I/O cubicles It can eliminate cables by placing the modules in junction boxes, kiosks in the yard or in the breaker/disconnector/ground switch itself, It can eliminate several field testing activities It can simplify the factory system testing for HVDC deliveries.

From the foregoing description of different variations of the present invention, it should be realized that it is only to be limited by the following claims.

The invention claimed is:

1. Apparatus for connection between power transmission system field equipment and control and protection equipment and comprising at least one input/output module,
    said input/output module comprising
    a box enclosing at least one circuit board with at least one signal handling unit,
    at least one bus connector that stretches through a first side of the box, and
    a set of terminal blocks for connection of field wires to the field equipment, the terminal blocks being placed on a second side of the box,
    on the second side of the box there is provided fastening means for fastening the set of terminal blocks on the second side, wherein said at least one signal handling unit includes at least one unit for conversion of input and output signals to and from said field equipment and bus communication according to a bus communication protocol, and wherein the set of terminal blocks is connected to the circuit board via interconnecting wires stretching through a side of the box.

2. Apparatus according to claim 1, wherein the second side is placed adjacent the first side.

3. Apparatus according to claim 1, wherein the box is shielded.

4. Apparatus according to claim 1, wherein the side is the first side.

5. Apparatus according to claim 1, wherein the set of terminal blocks is provided as separable movable units slidingly attached to the second side of the box.

6. Apparatus according to claim 5, wherein each terminal block is adapted to receive only one field wire.

7. Apparatus according to claim 1, wherein said at least one unit on the circuit board includes a field connection unit having signal conversion capability and a bus communication unit having bus communication capability.

8. Apparatus according to claim 7, wherein the field connection unit and bus communication unit are provided on separate circuit boards.

9. Apparatus according to claim 1, wherein the bus communication protocol is a process control bus communication protocol, like IEC 61850.

10. Apparatus according to claim 1, wherein the bus communication protocol is a field bus communication protocol.

11. Apparatus according to claim 1, further comprising more than one input/output module being interconnected via bus connectors.

12. Apparatus according to claim 11, further comprising a gateway module having process bus communication capability and being connected to the input/output modules via their bus connectors.

13. Apparatus according to claim 11, further comprising a cubicle, in which the interconnected devices are placed regularly around the edges of at least one inner side.

14. Apparatus according to claim 2, wherein the box is shielded.

15. Apparatus according to claim 2, wherein the side is the first side.

16. Apparatus according to claim 3, wherein the side is the first side.

17. Apparatus according to claim 2, wherein said at least one unit on the circuit board includes a field connection unit having signal conversion capability and a bus communication unit having bus communication capability.

18. Apparatus according to claim 3, wherein said at least one unit on the circuit board includes a field connection unit having signal conversion capability and a bus communication unit having bus communication capability.

19. Apparatus according to claim 4, wherein said at least one unit on the circuit board includes a field connection unit having signal conversion capability and a bus communication unit having bus communication capability.

20. Apparatus according to claim 5, wherein said at least one unit on the circuit board includes a field connection unit having signal conversion capability and a bus communication unit having bus communication capability.

* * * * *